US008799614B2

(12) United States Patent
Månsson et al.

(10) Patent No.: US 8,799,614 B2
(45) Date of Patent: Aug. 5, 2014

(54) STORING COMPRESSED DATA (75) Inventors: Staffan Månsson, Åkarp (SE); Ola Nilsson, Åkarp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 803 days.

(21) Appl. No.: 12/520,086

(22) PCT Filed: Dec. 17, 2007

(86) PCT No.: PCT/EP2007/011060
§ 371 (c)(1),
(2), (4) Date: Sep. 29, 2009

(87) PCT Pub. No.: WO2008/077523
PCT Pub. Date: Jul. 3, 2008

(65) Prior Publication Data
US 2010/0017578 A1    Jan. 21, 2010

Related U.S. Application Data (60) Provisional application No. 60/882,621, filed on Dec. 29, 2006.

(30) Foreign Application Priority Data

Dec. 22, 2006  (EP) ..................................... 06388072

(51) Int. Cl.
G06F 13/00    (2006.01)
G06F 13/28    (2006.01)

(52) U.S. Cl.
USPC .................... 711/171; 711/201; 711/E12.002; 707/693

(58) Field of Classification Search
USPC .................... 711/171, 201, E12.002; 707/693
See application file for complete search history.

(56) References Cited

U.S. PATENT DOCUMENTS 5,666,114 A  *  9/1997  Brodie et al. .................... 341/50

(Continued)

FOREIGN PATENT DOCUMENTS

| EP | 1 645 963 A | 4/2006 |
|---|---|---|
| WO | 94/19746 A | 9/1994 |
| WO | 97/23828 A | 7/1997 |

OTHER PUBLICATIONS

PCT International Search Report, dated Mar. 6, 2008, in connection with International Application No. PCT/EP2007/011060.
PCT International Preliminary Report on Patentability, dated Mar. 9, 2009, in connection with International Application No. PCT/EP2007/011060.

(Continued)

*Primary Examiner* — Edward Dudek, Jr.
(74) *Attorney, Agent, or Firm* — Leffler Intellectual Property Law, PLLC (57) ABSTRACT A method of processing data for storage in a storage medium coupled to a processing unit adapted to access data stored in the storage medium as one or more pages of data, each page having a predetermined page size and a corresponding virtual memory address, the method comprising: obtaining a compressed data item including compressed data corresponding to a first memory page of uncompressed data; dividing the compressed data item into an initial part and a supplementary part, the initial part having an initial part size; determining respective second memory locations for the supplementary parts so as to reduce the number of sectors occupied by the supplementary parts; allocating the initial part together with an index data item at a first memory location associated with the first memory page, the index data item being indicative of a second memory location; allocating the supplementary part at the second memory location.

24 Claims, 4 Drawing Sheets

(56) References Cited

U.S. PATENT DOCUMENTS

| | | |
|---|---|---|
| 6,332,172 B1 | 12/2001 | Iverson |
| 6,349,375 B1 | 2/2002 | Faulkner et al. |
| 6,643,754 B1 | 11/2003 | Challenger et al. |
| 2005/0226406 A1 | 10/2005 | Forin et al. |
| 2007/0030734 A1* | 2/2007 | Sinclair et al. ........... 365/185.11 |

OTHER PUBLICATIONS

Wilson, P.R. et al.: "Dynamic Storage Allocation: A Survey and Critical Review" Memory Management, International Workshop IWMM. Proceedings, XX, XX, Sep. 27, 1995, pp. 1-16, XP008003050.

\* cited by examiner

STORING COMPRESSED DATA

CROSS-REFERENCE TO RELATED APPLICATIONS

This application claims priority under 35 U.S.C. §119 to European Patent Application No. 06388072.8, filed Dec. 22, 2006, which is hereby incorporated herein by reference in its entirety. This application also claims the benefit of U.S. Provisional Application No. 60/882,621, filed Dec. 29, 2006, which is hereby incorporated herein by reference in its entirety.

TECHNICAL FIELD

This invention generally relates to the storing of data in a storage medium. More specifically, the present invention relates to the processing of data for storage in a storage medium associated with an embedded system or other processing device.

BACKGROUND AND DESCRIPTION OF RELATED ART

Many modern electronic devices, e.g. embedded devices, are controlled by software stored in flash memory. Flash memory is a type of memory that is frequently used in electronic devices, because it allows multiple rewrites. However, the write operations are limited to relatively large individual memory sectors, so-called erase blocks, at a time.

Previous embedded systems have frequently utilised so-called NOR flash memory and execution-in-place mechanisms where the software stored in the flash memory is executed directly from the flash memory. More recently, so-called NAND memory is increasingly used in embedded systems due to its relatively lower price for large storage capacities. However, due to its construction principles, NAND memory is generally not suitable for providing execution-in-place.

Embedded systems may use a combination of NOR and NAND memories, where a smaller NOR memory is used as software read-only-memory (ROM) and a larger NAND memory is partitioned with a file system for use as a random access storage area. However, the need for both NOR and NAND memories in such systems partly consumes the price advantage of NAND memory.

In other systems, the NAND is used both for software and constant data storage as well as random access storage. To this end, when executing software from NAND memories, virtual memory strategies are used, in which memory contents are first paged or copied from the NAND memory into memory-mapped random access memory (RAM) and executed there. Hence, in such systems, the NAND memory operates as a secondary medium/storage device, while the memory-mapped RAM operates as a primary memory.

Virtual memory or virtual memory addressing is a memory management technique, used by operating systems of computers and other processing devices, wherein non-contiguous memory is presented to a software/process as contiguous memory. This contiguous memory is referred to as the virtual address space.

Virtual memory is frequently implemented using paging. In paging, a range of consecutive addresses in a virtual address space (the range of addresses used by the processor) is mapped to a corresponding range of physical addresses of the memory. The memory referenced by such a range is called a page. The page size is typically in the range of 512 to 8192 bytes with a few e.g. 4 kbytes currently being a very common choice, though page sizes of 4 megabytes or larger may be used for special purposes.

The translation from virtual to physical addresses is typically implemented by a so-called memory management unit (MMU) that may be provided as a module of the central processing unit (CPU), or as an auxiliary, closely coupled chip. Memory management units thus are a class of computer hardware components responsible for handling memory accesses requested by the CPU. Apart from the translation of virtual addresses to physical addresses (i.e., virtual memory management), the MMU may perform further functions such as memory protection, cache control, bus arbitration, etc.

Demand paging is a particularly useful method of implementing virtual memory. In demand paging, the operating system copies a page from secondary memory (e.g. flash memory) into its primary memory (e.g. RAM), if an attempt is made to access it (e.g. if a page fault occurs).

In embedded systems it is generally desirable to reduce the storage requirements or to increase the storage capacity without increasing the amount of memory installed in the system, so as to keep production costs low.

The implementation of an embedded system that utilizes demand paging or other virtual memory techniques for executing code or reading constant data from virtual read-only memory has opened the possibility for compressing the code and constant data in the storage medium. The code and constant data is then to be decompressed when it is loaded into RAM for execution or read access by the CPU.

U.S. Pat. No. 6,349,375 discloses an embedded system in which data is stored in a storage medium in a compressed format. In response to a request for data by the CPU, the virtual memory system first determines whether the requested data is present, in uncompressed form, in the portion of main memory that is accessible to the CPU. If the requested data is not present in the decompressed portion of main memory but rather in a compressed format in the storage medium, the data is transferred into the decompressed portion of main memory by a demand paging operation. During the demand paging operation, the data is decompressed.

U.S. Pat. No. 6,332,172 discloses a method for reducing the memory requirements in a low resource computer system. In this prior art method a compressed image is stored in flash memory and pages of compressed memory are paged in at run-time, where the page-in operation includes decompressing the corresponding page data.

In such prior art methods and systems, the data may typically be compressed in portions of the same size as the MMU page size or multiples thereof (e.g. 4, 8 or 16 . . . kB). The compressed data corresponding to the respective memory pages will generally have a size smaller than the page size. However, due to the nature of data compression, the compressed data corresponding to the virtual memory pages will typically be of varying size, since the achievable compression ratio typically varies from page to page.

Consequently, the translation of virtual addresses to physical offsets in a consecutive image of concatenated compressed pages is non-linear and in practice requires a translation table. Such a translation table either needs to be stored in the storage medium or reconstructed at system boot. Assuming the minimal requirement of one word of 4 bytes per MMU-page and a MMU page size of 4 kB, the translation table would have a cost of 1 kB/MB. This translation table could be kept statically in RAM during the complete execution of the program, thereby increasing the RAM usage of the system. Alternatively, the translation table may be kept in the storage medium, thus causing the translation to result in an additional indirection through the storage medium. The extra time for reading this indirection would add to the time required to read the compressed data for one page, thus reducing the efficiency of the system.

In some storage media, such as hard-disks, NAND and other types of flash memories, data is accessed in entities larger than 1 byte, e.g. as disk sectors of a hard disk or NAND blocks, typically 512 bytes through a few Kbytes. For the purpose of the present description the entities larger than 1 byte in which the data is stored and/or accessed will be referred to as memory sectors or simply sectors. Consequently, in such systems, the additional read operation for reading the translation table would involve reading at least one such sector, and considerably increase the effective time to read a compressed page.

U.S. Pat. No. 5,666,114 discloses a method for accessing variable length compressed symbol strings in an addressable memory. According to this prior art method a compressed symbol exceeding the size of a linear or primary address segment is divided into a primary segment and an overflow segment such that a pointer to the overflow segment is embedded in the primary segment. The total fixed size address space is managed dynamically by adjusting the size of the linear segments and using the overflow space adjustably with the linear space to maintain a constant sum.

Hence this prior art method requires the system to dynamically vary the relative size of the linear address extent of the storage space and of the segments stored therein as the source symbol probabilities vary over time. This resizing involves a periodical and opportunistic rewriting of the linear and overflow extents as a function of whether the overflow has been under or overutilizes as a percentage of its current size. Depending on the storage medium such rewriting may require a considerable time and energy consumption. In particular for battery-driven devices and/or devices with limited computational resources such limitations may yield to a noticeable reduction of the performance of the device. Furthermore, a resizing of the primary segments further requires a change in the translation from the virtual to physical addresses. Furthermore, for certain types of storage media such as flash memory, the change of the size of the primary segments to sizes different from the block size of the storage medium may result in inefficient read and/or write operations.

Hence, it remains a problem to provide an improved method for storing compressed data in a storage medium.

SUMMARY

Disclosed herein is a method of processing data for storage in a storage medium coupled to a processing unit adapted to access data stored in the storage medium as one or more memory pages of data, each memory page having a predetermined page size and a corresponding memory page address, the method comprising:
 obtaining one or more compressed data items, each including compressed data corresponding to a respective memory page of uncompressed data;
 dividing each of the one or more compressed data items having a compressed data item size larger than a predetermined size into an initial part and a supplementary part;
 allocating each initial part together with a respective index data item at a respective first memory location associated with the corresponding memory page;
 determining respective second memory locations for each of the one or more supplementary parts so as to at least approximately minimize the number of sectors each supplementary part at least partially occupies;
 allocating each supplementary part at the determined respective second memory location, wherein each index data item is indicative of the determined second memory location of the supplementary part corresponding to the initial part allocated together with the index data item.

Consequently, the method disclosed herein allows allocation of the compressed data to the storage medium without the need for a translation table, since the start address of each page of data in virtual address space is linearly mappable to a location in the storage medium where the initial part of the compressed data is placed together with an index that points out where in the storage medium the rest of the compressed data for the page is located. The relationship between the virtual address and the location of the initial part in the storage medium may thus typically be determined by a simple arithmetic calculation.

As the respective second memory locations for the one or more supplementary parts are determined so as to at least approximately minimize the number of sectors each supplementary part at least partially occupies, the time required for reading each compressed memory page is minimized or at least reduced. Hence, a particularly memory-efficient method of storing the compressed data is provided while maintaining the efficient access to memory pages in a virtual memory system. In embodiments of the invention, the respective second memory locations are determined within a predetermined space of the storage medium available for storage of the supplementary parts. For example, the respective memory locations may be determined as respective starting addresses for the supplementary parts within a predetermined address space.

The at least approximate minimization may include the determination of an optimal layout resulting in a minimal number of at least partially occupied memory sectors for each of the supplementary parts. However, it will be appreciated that, in some situations, it may not be possible and/or feasible to obtain such an optimal solution, and the process may determine a solution that only approximately minimises the number of at least partially occupied memory sectors for each of the supplementary parts, e.g. by allowing a subset of supplementary parts to occupy more than the minimal number of memory sectors. Nevertheless, such an approximate minimisation will generally result in a reduction of the number of at least partially occupied memory sectors for each of the supplementary parts.

Hence, the method described herein performs faster compared to methods where a translation table is kept in the storage medium, and the method described herein eliminates the need of RAM compared to methods where the translation table is kept in RAM. Furthermore, embodiments of the method disclosed herein do not require a dynamic resizing of the initial parts.

In one embodiment, the storage medium is adapted to store data in sectors of a predetermined sector size, and the size of the initial part—also referred to herein as the initial part size—is selected such that a sum of the initial part size and a size of the index data item is no larger than the sector size. Consequently, each initial part may be stored aligned to the start of a sector, thereby providing a particularly simple mapping of virtual page addresses to physical memory addresses and an efficient loading, since reading the initial part from memory only requires reading a single memory sector, e.g. a single disk sector of a hard disk, a single block of a flash memory, or the like.

As mentioned above, in virtual memory systems, the loading—or paging in—of memory content corresponding to virtual memory pages is typically, though not necessarily, performed based on virtual address information, e.g. obtained when a memory management unit generates a page fault for a given virtual address indicating that no corresponding physical memory of the primary memory is mapped to this virtual address. Accordingly, in one embodiment, the processing unit is adapted to translate the virtual address information into a physical address of the storage medium. In one embodiment the translation is performed as a linear mapping between virtual addresses and physical addresses of the storage medium.

In one embodiment, allocating each initial part together with a respective index data item at a respective first memory location comprises allocating one or more initial parts and respective index data items as a sequence of initial part data items corresponding to a sequential order of memory pages addressable by the processing unit, where the page size is larger than a predetermined maximum size of the initial part data items (e.g. corresponding to the sector size of the storage medium). Hence, the page numbers are mappable to consecutive equally-sized ranges of memory, e.g. to consecutive memory sectors, thereby providing a particularly simple mapping between virtual memory pages and physical addresses of the storage medium. It will be appreciated that some compressed pages may be smaller than the determined maximum size. Such compressed pages thus do not require being split up but may be stored as an initial part including the entire compressed page data.

In one embodiment, the method described herein is performed for all—or at least a part of—the pageable memory content to be stored in the device. Typically the pageable content corresponds to a plurality of pages.

In one embodiment, the method further comprises arranging at least a subset of the supplementary parts in multiples of supplementary parts so as to at least approximately minimize a predetermined cost criterion. In particular, in one embodiment, the cost criterion is indicative of a deviation of the respective sizes of the multiples of supplementary parts from respective integer multiples of the sector size. Consequently, the number of memory sectors occupied by the resulting memory layout is reduced, thereby providing efficient access, since fewer memory sectors need to be read in order to retrieve the compressed data. Likewise, this layout further facilitates an efficient update of the stored memory content, since the number of memory sectors that need to be updated is reduced.

Hence, in some embodiments, the respective second memory locations for the one or more supplementary parts are further determined so as to at least approximately minimize the number of sectors at least partially occupied by at least one of the supplementary parts. By determining respective second memory locations for the supplementary parts so as to reduce the number of sectors occupied by the supplementary parts, the total memory usage for storing the compressed data is reduced. In one embodiment, the at least approximate minimization of the number of sectors at least partially occupied by at least one of the supplementary parts is performed under a constraint preventing the increase of the number of sectors each supplementary part at least partially occupies.

In one embodiment, arranging at least a subset of the supplementary parts includes arranging at least the subset of the supplementary parts in pairs of supplementary parts such that each pair of supplementary parts occupies a range of consecutive sectors of the storage medium, the range including an initial and a last sector, and such that the start address of a first member of each pair is aligned with a start address of the corresponding initial sector, and the final address of a second member of each pair is aligned with a final address of the corresponding final sector. Consequently, the number of memory sectors occupied by each of the pair of supplementary parts may further be reduced. In one embodiment, the pairs are combined such that the pair as far as possible fills an integer number of sectors, so as to minimize the slack/padding that remains unused. For example, the distribution of pairs may be performed by determining an at least approximate solution of an optimization problem with the amount of unused padding space as a cost function.

In a further embodiment, the method further comprises:
identifying unused memory space in sectors partially occupied by initial part data items;
determining whether at least one of the supplementary parts is small enough to fit in the identified unused space;
if a supplementary part is identified that is small enough to fit into an identified unused space, determining the identified unused space to be the second memory location for allocating the identified supplementary part.

Hence, in some embodiments, the space of the storage medium available for storage of the supplementary parts includes unused memory space in sectors partially occupied by initial part data items, thereby further increasing the efficiency of the memory usage.

Similarly, in one embodiment, the method further comprises:
identifying unused memory space in sectors partially occupied by a multiple of supplementary parts;
determining whether at least one remaining supplementary part, different from the members of the identified multiple of supplementary parts, is small enough to fit in the identified unused space;
if a remaining supplementary part is identified that is small enough to fit into an identified unused space, determining the identified unused space to be the second memory location for allocating the identified remaining supplementary part.

Hence, in some embodiments, the space of the storage medium available for storage of the supplementary parts includes unused memory space in sectors partially occupied by one or more supplementary parts.

Consequently, the storage requirement for storing the memory content is further reduced.

Even though the initial part and the index data item may be combined in other ways, when the initial part data item includes the initial part concatenated with the index data item, a particularly simple and efficient storage and access is provided. Similarly, Even though other divisions of the initial part and supplementary part may be provided, when the compressed data item is a concatenation of the initial part and the supplementary part, a particularly simple and efficient storing and access is provided.

Further preferred embodiments are disclosed in the dependant claims.

The present invention can be implemented in different ways including the method described above and in the following, a method of loading data stored in a secondary storage medium into a primary memory of a processing device, a processing device, and further systems and product means, each yielding one or more of the benefits and advantages described in connection with the first-mentioned method, and each having one or more preferred embodiments corresponding to the preferred embodiments described in connection with the first-mentioned method and/or disclosed in the dependant claims.

In particular, according to one aspect, a method of loading data from a secondary storage medium into a primary memory of a processing device comprises:
  addressing the data as data pages in a virtual memory space, each page having a predetermined page size, wherein the secondary storage medium has stored thereon one or more compressed data items, each compressed data item including compressed data corresponding to a corresponding memory page of uncompressed data; wherein the secondary storage medium has stored thereon each compressed data item that is larger than a predetermined size as an initial part stored together with an index data item, and as a supplementary part stored at a memory location identified by the index data item; wherein the respective memory locations for the supplementary parts are selected so as to at least approximately minimize the number of sectors each supplementary part at least partially occupies;
  determining a physical address of an initial part of a compressed data item corresponding to a first memory page to be loaded from the secondary memory into the primary memory;
  determining a physical address of a supplementary part from an index data item stored with the initial part;
  decompressing the initial part and the supplementary part to obtain the first memory page of uncompressed data.

In one embodiment, determining a physical address of the initial part includes applying a linear mapping between a memory page address and a physical address of the secondary memory, i.e. by computing the physical address as a linear function of at least the memory page address.

It is noted that the features of the methods described above and in the following may be implemented in software and carried out on a data processing system or other processing means caused by the execution of program code means such as computer-executable instructions. Here and in the following, the term processing means comprises any circuit and/or device suitably adapted to perform the above functions. In particular, the term processing means comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

For example, the program code means may be loaded in a memory, such as a Random Access Memory (RAM), from a storage medium or from another computer/computing device via a computer network. Alternatively, the described features may be implemented by hardwired circuitry instead of software or in combination with software.

According to another aspect, a data processing system is suitably programmed to perform the steps of the method described above and in the following.

According to another aspect, a computer program product comprises program code means adapted to cause a data processing system or other processing means to perform the method described above and in the following, when said program code means are executed on the data processing system or other processing means. The computer program product may be embodied as a computer-readable medium having stored thereon said program code means, such as optical disks, hard disks, floppy disks, tapes, CD ROMs, flash memory, memory sticks, and/or other types of magnetic and/or optical storage medium.

According to another aspect, a processing device comprises a processing unit and a storage medium coupled to the processing unit, the processing unit being adapted to access data stored in the storage medium as one or more pages of data, each page having a predetermined page size and a corresponding virtual memory address, the processing device being adapted to have stored compressed data items in the storage medium, each compressed data item including compressed data corresponding to a corresponding memory page of uncompressed data; wherein the processing device is configured to have stored each compressed data item that is larger than a predetermined size as a corresponding initial part and a supplementary part; wherein the processing device is further configured to store each initial part in the storage medium together with a corresponding index data item at a respective first memory location associated with the corresponding memory page, wherein the processing device is further configured to determine a respective second memory location for each supplementary part so as to at least approximately minimize the number of sectors each supplementary part at least partially occupies and to store each supplementary part in the storage medium at the determined respective second memory location; wherein each index data item is indicative of the second memory location of the supplementary part corresponding to the initial part stored together with the index data item.

For the purpose of the present description, the terms processing device and electronic device comprise any device comprising a memory such as a flash memory for storing data such as program code and constant data. Examples of such devices include portable radio communications equipment and other handheld or portable devices. The term portable radio communications equipment includes all equipment such as mobile telephones, pagers, communicators, i.e. electronic organisers, smart phones, personal digital assistants (PDAs), handheld computers, media players, such as mp3 players, digital cameras or other recording devices, embedded devices in the automotive industry, medical devices, or the like.

The storage medium/device may be a non-volatile storage medium, such as flash memory, e.g. NAND memory. It will be appreciated though that the method system and apparatus described herein also may be implemented in connection with other types of storage media, such as other types of flash memory, e.g. NOR flash memory, and/or other types of storage media that are accessible in sectors, such as hard disks, or the like.

In one embodiment, the processing device further comprises a memory management unit adapted to map pages of a virtual memory space to physical addresses of a primary memory of the processing device, such as a RAM. The memory management unit may be implemented as a hardware component included in or coupled to the central processing unit of the processing device. Alternatively, the memory management unit may be implemented at least in part as one or more software components. In some embodiments, the processing unit is adapted to access the data stored in the storage medium based on virtual address information, and the processing unit is adapted to translate the virtual address information into a physical address of the storage medium.

In one embodiment, the processing device is adapted to map a sequence of memory pages to a corresponding sequence of initial part data items, where the page size is larger than a predetermined maximum size of the initial part data items.

In one embodiment, the processing device further includes means for decompressing the compressed data item. The means for decompressing may be implemented as a hardware component, as software functionality, or as a combination of hardware and software. For example, the decompression may be performed by a suitable device or circuitry included or coupled to the central processing unit. Alternatively or additionally the decompression may be performed by software executed by the central processing unit.

BRIEF DESCRIPTION OF THE DRAWINGS

The above and other aspects will be apparent and elucidated from the embodiments described in the following with reference to the drawings in which.

DETAILED DESCRIPTION

Figure 1:
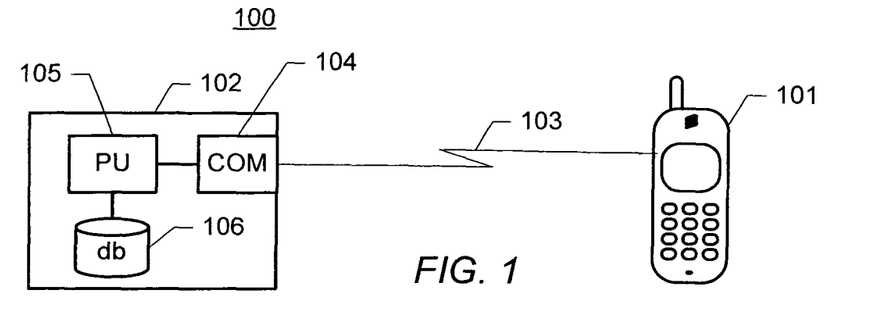
FIG. 1 schematically shows a block diagram of a system for generating a memory image for a processing device such as a mobile terminal and for storing the generated image in the processing device.

FIG. 1 schematically shows a block diagram of a system for generating a memory image for a processing device such as a mobile terminal, e.g. an image of an initial or updated build of one or more software modules and/or constant data, and for uploading the generated image to the processing device. The system, generally designated 100, comprises a software distribution system 102 and a processing device 101 connectable to the software distribution system 102 via a communications interface 103.

The software distribution system 102 may comprise a server computer or other data processing system having access to the communications interface 103. In some embodiments, the functionality of the software distribution system 102 may be distributed among a plurality of computers, e.g. computers connected via a computer network, e.g. a local area network, a wide area network, an Internet, or the like. The software distribution system 102 comprises an interface circuit 104 allowing the software distribution system 102 to communicate data via the communications interface 103. For example, the interface circuit 104 may comprise a serial port, a parallel port, a short-range wireless communications interface, e.g. an infrared port, a Bluetooth transceiver, or the like. Further examples of interface circuits include a network card, a DSL modem, a gateway computer, a wireless communications circuit for cellular telecommunications, or the like.

The software distribution system 102 further comprises a processing unit 105, e.g. the CPU of a server computer, suitably programmed to control and perform the image generation and distribution process. As will be described in greater detail below, the image generation and distribution process includes compression of the image and arranging memory content corresponding to pages of a target virtual memory system in an efficient way. The processing unit 105 may further perform the actual code generation process, e.g. including one or more compilation and linking steps. Alternatively, the code generation may be performed by a separate computer system, and the generated code may be transferred to the processing unit 105, e.g. in the form of executable code generated by a linker. The software distribution system 102 may further comprise additional components, such as a database 106 or other repository for the software to be distributed, and/or further components (not explicitly shown) for e.g. version management and/or the generation and management of incremental software updates, security modules, e.g. for integrity protecting and/or authenticating the distributed image data, e.g. by public-key and/or private-key security mechanisms, and/or the like.

The communications interface 103 may be any suitable wired or wireless communications interface for communicating data between the software distribution system 102 and the processing device 101. For example, in the case of a mobile telephone adapted to communicate via a cellular communications network, e.g. a GSM network, a UMTS network, a GPRS network, or the like, the communication between the software distribution system and the mobile terminal in connection with a software update may be performed via that cellular communications network, thereby avoiding the need for additional communications interfaces in the mobile terminal. Further examples of suitable communications interfaces include a serial interface, a universal serial bus (USB), an infrared interface such as IrDa, a local area network, a short-range radio-frequency interface, e.g. according to the Bluetooth standard, and/or the like.

Hence, in order to load new software or to update existing software and/or constant data on the processing device 101, the processing device 101 may receive loading/updating instructions from the software distribution system 102, e.g. including the images of the memory sectors to be rewritten. In a differential software updating system 102 using delta files, the updating instructions are generated such that they enable the processing device 101 to generate the updated software version from the existing version already stored in the processing device 101 and from additional information included in the updating instructions.

Hence, in the above, one possible scenario is described for distribution of software and/or constant data. However, it will be appreciated that the generation of the memory layout for compressed data described herein may be applied to other distribution scenarios as well. For example, the software and/or constant data may be provided to the target device via other media, e.g. other communications channels, via a computer-readable medium, etc.

Figure 2:
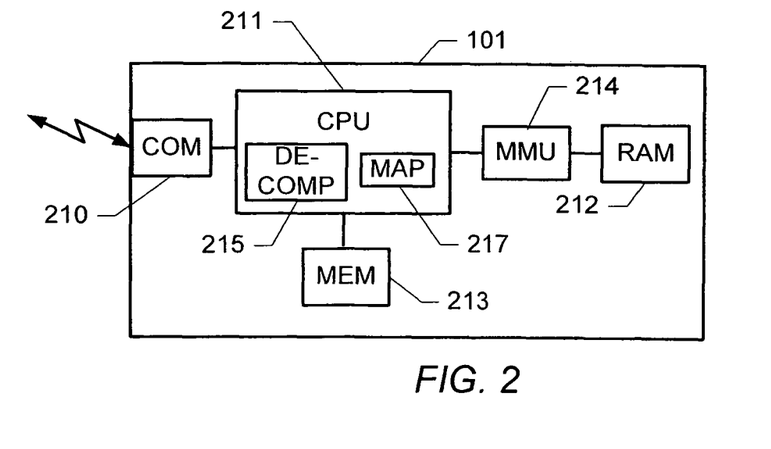
FIG. 2 schematically shows a block diagram of an embodiment of a processing device such as a mobile terminal.

FIG. 2 schematically shows a block diagram of an example of a processing device such as a mobile terminal. The processing device 101 comprises a central processing unit (CPU) 211, a primary memory 212, such as a RAM, accessible to the processing unit 211, and a secondary storage medium/device 213, such as a flash memory. The CPU may be implemented by a single chip or by multiple processors. For example, the CPU may include a suitably programmable microprocessor. Using instructions received from primary memory 212, the CPU 211 controls the operation of the processing device, e.g. the reception and manipulation of input data and the output and display of data on output devices. In the case of a mobile terminal the operation may further include radio-based communication via a cellular communications network. To this end, CPU 211 may further control and/or interoperate with additional components of the processing device, such as one or more communications components 210. The communications components 210 may include a suitable transmitter and receiver circuitry for transmitting/receiving communications signals, circuitry for suitably processing the signals, e.g. modulating, coding, amplifying, etc., the signals by suitable techniques well known in the art of radio communications. Further examples of communications components include circuitry or devices for providing a suitable wired or wireless communications interface for communicating data between the software distribution system 102 and the processing device 101 as described above.

The primary memory 212 may be random access memory, such as static RAM (SRAM), dynamic RAM (DRAM), or any other suitable type of random access memory. The primary memory 212 may be coupled bi-directionally to the CPU 211, e.g. directly or, as shown in FIG. 2, via a memory management unit (MMU) 214. During operation, the primary memory 212 includes operating instructions, program code, data and objects used by the CPU 211 to perform its functions.

Upon commencement of the operation of the CPU 211, or when a software component is invoked to be executed by CPU 211, operating instructions are typically loaded from secondary storage medium 213 into primary memory 212 where it is accessible by the CPU.

In the example of FIG. 2, the CPU 211 is coupled to the primary memory 212 via a Memory Management Unit (MMU) 214. The MMU 214 is typically implemented as a hardware component and is configured to map virtual addresses received from CPU 211 to physical addresses in the primary memory 212. There may be more virtual addresses than physical addresses such that the relationship between virtual address to physical address is many to one. The virtual memory utilized via MMU 214 is broken into pages, preferably of identical size.

Modern MMUs typically divide the virtual address space into pages having a page size in bytes that is a power of 2. The bottom n bits of the address typically represent the offset within a page, and are left unchanged, while the upper address bits are the virtual page number, thus providing a mapping from a range of consecutive addresses in virtual address space to a range of consecutive addresses in physical address space. The physical address in RAM 212 is typically also broken into pages, also referred to as page frames. Generally, any page may be stored in any page frame, typically such that virtual pages are loaded such that they start at the start of a physical page frame.

The mapping between virtual pages and page frames may be performed by means of a page table which relates virtual page numbers to page frame numbers and which may be maintained in the primary memory 212. The MMU normally translates virtual page numbers to physical page numbers via an associative cache called a Translation Lookaside Buffer (TLB). When the TLB lacks a translation, a slower mechanism involving hardware-specific data structures or software assistance is used. The data items found in such data structures are typically called page table entries (PTEs), and the data structure itself is typically called a page table. The physical page number is combined with the page offset to give the complete physical address.

In a demand paging system, upon commencement of operation, not all virtual pages need initially be loaded into primary memory 212. Accordingly, if during subsequent operation a virtual address requested by the CPU 211 does not have a corresponding physical address in primary memory 212, the MMU 214 generates an exception, typically referred to as a "page fault". When a page fault occurs, an available physical address is mapped to the virtual address which caused the page fault. For example, the available physical address may be provided by discarding a pre-existing mapping of another virtual address to this physical address, thus making the physical address newly available for mapping to the virtual address which caused the page fault. MMU 214 keeps track of the virtual address to physical address mapping.

Secondary storage medium 213 may be non-volatile memory such as flash memory, ROM, a hard disk, or an input/output device, a RAM, or the like. In some implementations, primary memory 212 and secondary memory 213 may even be implemented as different portions of the same physical memory unit. The secondary storage medium 213 has stored thereon the compressed content of the memory pages that are loadable into primary memory 212 under control of CPU 211. For example, secondary storage medium 213 may have stored thereon a compressed RAM image, e.g. as generated by and received from a software distribution system as described above.

For example, the secondary storage medium 213 may have stored thereon the firmware, e.g. including an operating system, of the processing device 101 that implements the basic functions of the processing device when loaded into the primary memory 212 and executed by the central processing unit 211. The secondary storage medium 213 may have further stored thereon application software providing additional functionality when loaded into the primary memory 212 and executed by the central processing unit 211. In some embodiments, the secondary storage medium 213 may be readable and/or writable in sectors each including a plurality of bytes of data. For example, the storage medium 213 may comprise flash memory allowing data to be read in sectors/blocks of a predetermined size. However, it is understood that any other addressing of the storage medium may be used, instead. It is further understood that the method of storing data described herein may be applied to the entire content of storage medium 213, or only to a part of the contents. The secondary storage medium 213 is coupled to the CPU 211, e.g. directly, via a memory controller, or the like.

When the content of a new virtual page is to be loaded into primary memory 212, the corresponding compressed data is read from the secondary storage medium 213 and decompressed by the central processing unit 211, e.g. under control of a suitable mapping block 217 for mapping virtual addresses to physical addresses of the secondary storage medium and for controlling the loading of the compressed data in uncompressed form into primary memory 212. The decompression is performed by a decompression block 215 of the CPU 211, e.g. suitable decompression software executed by the CPU, optionally assisted by a hardware accelerator.

It will be appreciated that the mapping block 217 and the decompression block 215 may be implemented in software, in hardware, or as a combination of hardware and software. For example, the mapping block 217 and/or the compression block 215 may be embodied as one or respective software components executed by the CPU 211, e.g. as part of or invoked by an exception handler routine for handling page faults generated by the MMU. Embodiments of the functions performed by the mapping block will be described in greater detail below.

Even though shown as separate blocks in FIG. 2, the decompression unit 215 and/or the mapping block 217 may also be implemented integrated as a single functional block and/or integrated with other functional blocks e.g. integrated with other software components such as the operating system of the processing device. In an alternative embodiment, the mapping block 217 and/or the decompression block 215 may be implemented as one or more hardware blocks separate from the CPU 211. In yet another alternative embodiment, the access and decompression of compressed data may be performed by or under control of the MMU.

In the following, an embodiment of a method for processing data for storage in a processing device will be described with reference to FIGS. 3-4.

Figure 3:
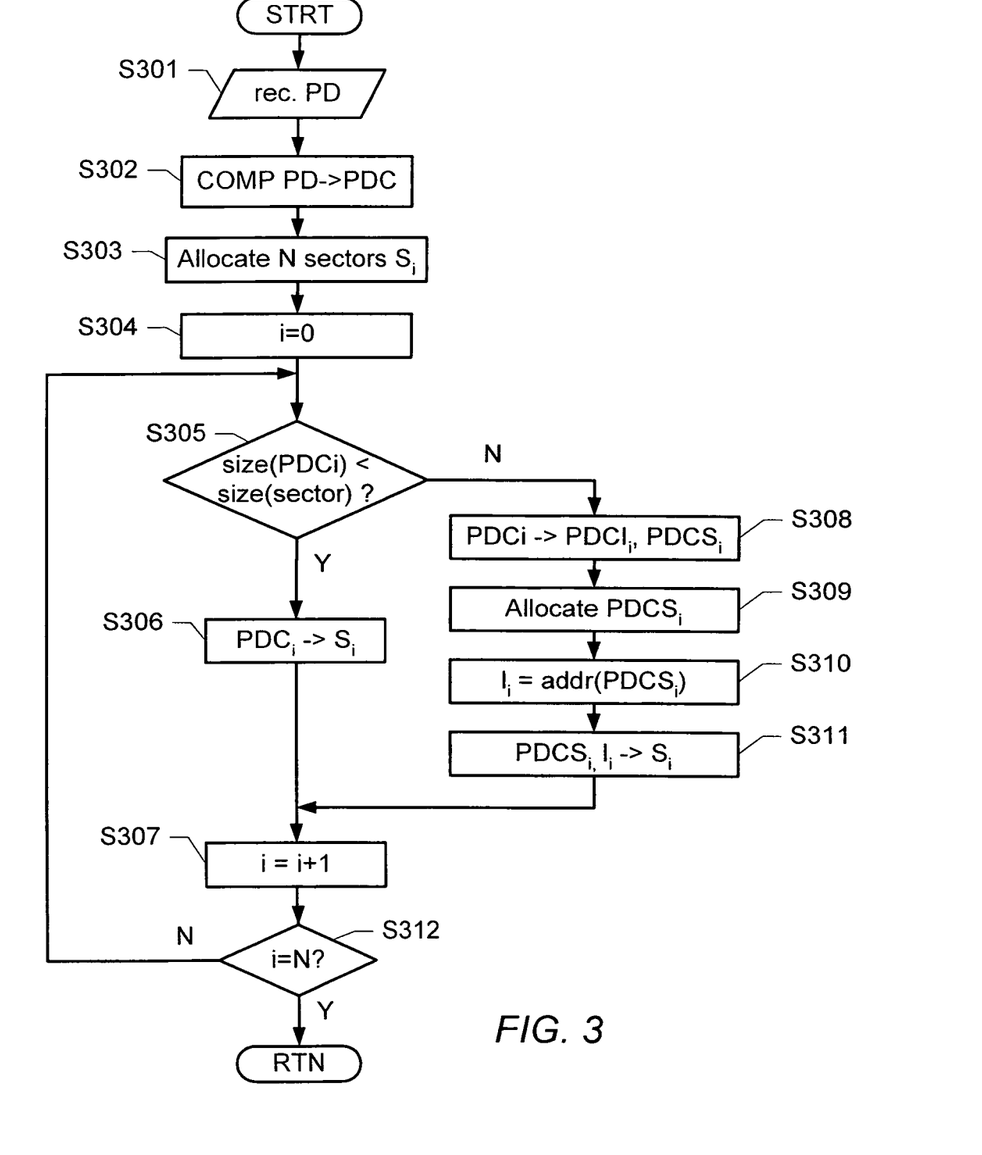
FIG. 3 shows a flow diagram of a process for processing data for storage in a secondary storage medium of a processing device.
Figure 4:
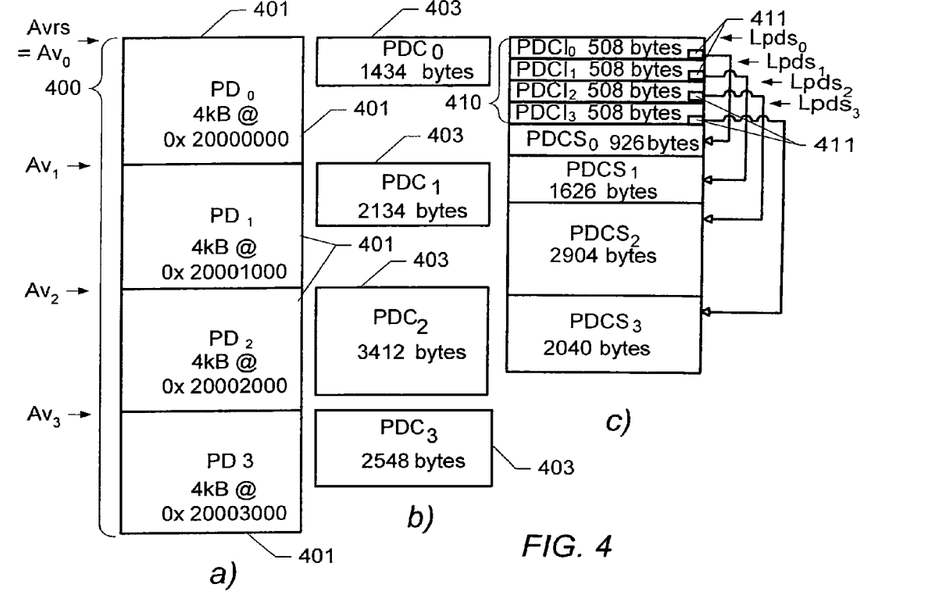
FIG. 4 illustrates an example of a memory layout of a secondary storage medium of a processing device.

FIG. 3 shows a flow diagram of a process for processing data for storage in a secondary storage medium of a processing device, while FIG. 4 illustrates an example of a memory layout of a secondary storage medium of a processing device. For example, the process may be implemented as a part of a build process for generation a software version or build for installation in a processing device. Typically, such a build process receives source code modules, compiles and links the source code modules resulting in an executable file to be loaded into the device. The process described herein, may thus be performed after the linker stage, e.g. as a separate process or as an integral part of the build process. Accordingly, the process described herein may be performed by a separate software application, or by an integrated application or suite of applications for performing the entire build process.

Initially, in step S301 of the process shown in FIG. 3, the process receives the data to be processed, e.g. a linked executable software component, e.g. as output by a conventional linker. As mentioned above, a certain range of the virtual address space of the processing device including code and constants may at system configuration time be defined to be paged in on demand from the secondary storage medium. For the purpose of the present description, the data content corresponding to a virtual memory page will also be referred to as page data (PD).

FIG. 4a shows an example of a range 400 of virtual address space. In the example of FIG. 4, the range 400 of virtual memory space includes four consecutive pages 401 of 4 kbytes each. The start addresses of the pages in virtual memory space of the target processing device are 0x20000000, 0x20001000, 0x20002000, 0x20003000, respectively. The corresponding page data is designated $PD_0$, $PD_1$, $PD_2$, and $PD_3$. The number, size, and start addresses of the pages 401 in FIG. 4 are merely intended to serve as a non-limiting example. It will be appreciated that the virtual address space may include a different number of pages, of different size, and/or at different start addresses.

In subsequent step S302, the process compresses the page content corresponding to each page in the range using a suitable compression algorithm into a compressed data item. For the purpose of the present description the compressed data content corresponding to a virtual memory page will also be referred to as compressed page data (PDC). Suitable compression algorithms for compressing software and constant data are well known in the art, and they may be implemented in software or hardware, or as a combination of both. Examples of suitable compression algorithms include lossless compression algorithms such as the Lempel-Ziv (LZ) compression method, the DEFLATE algorithm, the LZW (Lempel-Ziv-Welch) algorithm, the LZR (LZ-Renau) methods, compressors using probabilistic models and arithmetic coding, and/or the like.

Common for most compression algorithms is that typical sizes of the compressed data for a virtual memory page are in the range between 30-90% of the original size and an expected average value may be approximately 60-70%.

FIG. 4b shows the compressed data items 403, designated $PDC_0$, $PDC_1$, $PDC_2$, $PDC_3$, respectively, resulting from compression of the corresponding page data $PD_0$, $PD_1$, $PD_2$, and $PD_3$, respectively. For the purpose of the example of FIG. 4, page data $PD_0$ is assumed to be compressed from 4 kbytes to 1434 bytes, while $PD_1$, is assumed to be compressed to 2134 bytes, $PD_2$ is assumed to be compressed to 3412 bytes, and $PD_3$ is assumed to be compressed to 2548 bytes. It is understood, however, that these sizes merely serve as a non-limiting example.

In subsequent steps S303-S312, the compressed data is laid out in the physical memory space of the storage medium, e.g. as illustrated in FIG. 4.

Each PDC is associated with a corresponding sector in the storage medium (e.g. disk sector if the storage medium is a hard drive or memory block if it is a NAND flash memory) in the sequential order of the virtual addresses of the original data. This way the cost for finding the compressed data in the storage is minimized, because the location of the initial part of the compressed data may be calculated by a simple arithmetic expression:

$$Lpds = \frac{Av - Avrs}{Spmmu} \quad (1)$$

wherein Lpds designates the location within the storage medium where the initial part of the compressed data is stored, Av designates the virtual address of the requested virtual memory page, Avrs designates the start address of the virtual memory range stored in the storage medium, and Spmmu designates the size of an MMU page. Typically, $L_{pds}$ is a positive integer number, e.g. a sector number or relative sector number, Av and Avrs are respective multiples of Spmmu, and Spmmu may be any number of bytes, typically a few Kbytes, such as 4 kbytes. Hence, the location within the storage medium may be calculated as a linear function of the virtual address of the requested virtual memory page. Most MMUs use a page size that is a power of two. Consequently the above division operation may efficiently be implemented as a shift right operation.

Since the sectors in the storage medium are typically smaller than the vast majority of the compressed data for a memory page, each associated sector only has capacity to store an initial part of each compressed data item plus an index that refers to the location of the rest (or so-called supplementary part) of the compressed data of the page.

Nevertheless, in the event that the compressed data for a page is smaller than the sector size of the storage medium, the remaining part of the associated sector may remain unused/empty, so as to ensure that the initial part of the subsequent page is aligned to the subsequent sector. In some embodiments, the unused parts of such sectors may be used to store small instances of supplementary parts of other compressed pages, if any.

Accordingly, in step S303, the process identifies the number of consecutive pages in the virtual address range to be processed, and allocates a corresponding number of consecutive sectors of the storage medium to the respective memory pages. Denoting the number of memory pages by N, the following steps are performed for each memory page. Accordingly, in step S304, a counter i is initialised, e.g. to i=0.

In step S305 the process determines whether the i-th compressed page data ($PDC_i$) of the sequence of pages is small enough to fit into a single sector of the storage medium.

If this is the case, the process proceeds at step S306 and allocates the compressed data item to the next available memory sector $S_i$ starting from a predetermined start address/sector. In some embodiments, the compressed data item (PDC$_j$) includes information about its own size. For example, the process may include the size of the complete PDC in the beginning of the PDC, i.e. before the actual compressed data, thus allowing the subsequent retrieval process to determine the amount of data to read. Depending on the compression algorithm used, the size of the compressed data may already have been included in the compressed data by the compression algorithm. In an alternative embodiment, the process may append an index data item of a predetermined value to indicate that there is no supplementary part to be read. Alternatively or additionally, it will be appreciated that the information about the amount of data to be read and the indication as to whether a supplementary part is to be read may be provided in different ways. Subsequently, the process proceeds at step S307.

Otherwise, i.e. if the determination in step S305 has indicated that PDC$_i$ is larger than the sector size, the process proceeds at step S308, and splits/divides the compressed page data (PDC$_i$) into an initial part (PDCI$_i$) and a supplementary part (PDCS$_i$), such that the initial part together with an index data item fits into sector S$_i$. The PDCI$_i$ is stored in the sector S$_i$ associated with the virtual memory page i together with an index I$_i$ that points out where in the storage medium the corresponding supplementary part PDCS$_i$ is located, i.e. I$_i$ indicates the physical address in the storage medium where PDCS$_i$ is stored. For example, the index I$_i$ may be appended to the initial part PDCI$_i$ resulting in an initial part data item including a concatenation of the initial part and the index data item. Accordingly, in step S309, the process determines a location for storing PDCS$_i$. In step S310 the process assigns the start address of PDCS$_i$ to the index I$_i$, and in step S311, the process allocates PDCI$_i$ and the index I$_i$ to sector S$_i$.

The supplementary part may be stored at a suitable location of the storage medium which is still available. An example of a process for allocating the supplementary parts in an efficient manner will be described below.

Subsequently, the process proceeds at step S307 where the process increments the counter i, e.g. to i+1. At subsequent step S312, the process determines whether all N pages have been processed, i.e. whether i=N. If this is not the case, the process returns to step S305 to process the next page. Otherwise, the process terminates.

Again referring to the example of FIG. 4, FIG. 4c shows the resulting memory layout when the compressed page data of FIG. 4b is allocated according to the method of FIG. 3. For the purpose of the example of FIG. 4, the storage medium is assumed to have a sector size of 512 bytes, and the index data item is assumed to require 32 bits (i.e. 4 bytes). Again, it is understood that these numerical values are merely intended to serve as non-limiting examples, and that the method may be implemented for different sector sizes and/or different index sizes. The range of consecutive sectors 410 includes the initial parts PDCI$_0$, PDCI$_1$, PDCI$_2$, and PDCI$_3$, of the compressed page data PDC$_0$, PDC$_1$, PDC$_2$, and PDC$_3$, respectively, and corresponding index data items 411. The corresponding supplementary parts PDCS$_0$, PDCS$_1$, PDCS$_2$, and PDCS$_3$ are stored in consecutive address ranges following the range of sectors allocated to the initial parts, and the index data items 411 point to the start addresses of the respective supplementary parts. In FIG. 4c, the supplementary parts are shown allocated in the same order as the corresponding initial parts. Nevertheless, it will be appreciated that the supplementary parts may also be allocated in a different order. Furthermore, even though the supplementary parts are shown stored in extension of the sectors occupied by the initial parts and stored in a range of consecutive sectors, the supplementary parts may also be stored in a different layout, e.g. in non-consecutive locations and/or remotely from the initial parts.

For example, when for an MMU operating with a page size of 4 kB and for a sector size of 512 bytes a certain page PD$_i$ is compressed with a compression ratio of e.g. 62.5%, the resulting size of compressed page data PDC$_i$ is 2506 bytes. Assuming the size of the index data item is 32 bits (4 bytes), only the initial 508 bytes of compressed data fit in the associated sector. The remaining 1998 bytes may then be allocated to another location of the storage medium and the index in the associated sector may point at that location. It will be appreciated that in some embodiments, the size of the initial parts (plus the index size) may be selected to correspond to twice or another integer multiple of the sector size, e.g. in implementations where the page size and the sector size are such that a compression of the page data to less than twice or another multiple of the sector size is very unlikely. In some embodiments, the size of the initial parts may even be determined as a multiple of sector sizes such that the memory utilisation is optimised.

After performing the processing of the data described in connection with FIG. 3, the software distribution system may perform further processing steps so as to generate a software distribution including the generated software image. Such processing steps may include one or more of the following: Version control, integrity protection, authentication, encryption, etc. Subsequently, the software distribution may be sent to the processing device and stored thereon by any suitable software distribution method.

Figure 5:
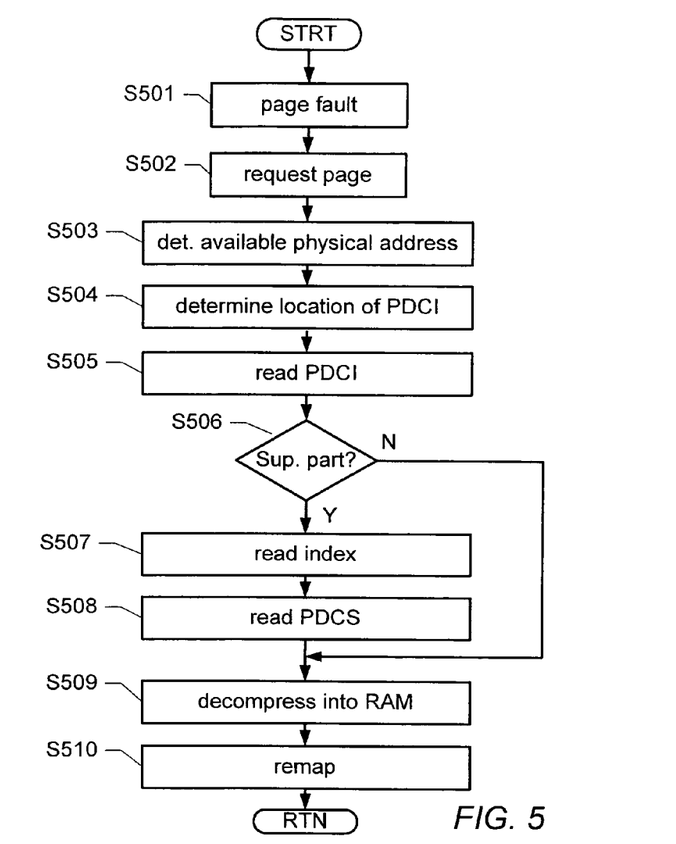
FIG. 5 shows a flow diagram of a method of loading data from the secondary storage medium into the primary memory of the processing device.

FIG. 5 shows a flow diagram of a method of loading data from the secondary storage medium into the primary memory of the processing device.

In step S501, the CPU attempts to address a memory page that is currently not loaded in the primary memory, thus resulting in a page fault.

In subsequent step S502, the CPU requests the memory page that resulted in the page fault to be mapped by the MMU.

In step S503, the process determines a physical address in primary memory to which the requested page can be loaded. This may include demapping another page that is currently loaded at that address but is not currently used.

In step S504, the CPU calculates the location of the initial part of the compressed data (PDCI) in the secondary storage medium from the virtual address of the page that caused the page fault, e.g. based on eqn. (1) above.

In step S505, the CPU reads the sector including the initial part of the compressed page data (PDCI) of the requested page from the secondary storage medium.

In step S506, the CPU determines from the content of the initial part whether the initial part includes the entire compressed data of the requested page or whether a supplementary part needs to be read. As described above, this determination may for example be based on size information included in the initial part, or on any other suitable information included in the initial part or index data item. If the initial part includes the entire compressed data, the process continues at step S509; otherwise the process continues at step S507.

In step S507, the CPU determines the location of the supplementary part from the index data item appended to the initial part.

In step S508, the CPU reads the supplementary part of the compressed page data (PDCS) of the requested page from the secondary storage medium, starting at the address identified by the index data item.

In step S509, the decompression block decompresses the compressed page data into the primary memory at the address determined in step S503 resulting in the de-compressed page data of the requested page.

In step S510, the MMU updates its mapping, e.g. in the form of a page table, thus associating the page number of the requested and loaded page with the address in primary memory to which the decompressed page data was loaded. Subsequently, the process terminates.

As mentioned above, to minimize the number of sectors that need to be read when loading the compressed data (PDC) for a page, it is desirable to plan the layout such that the data to read from the medium overlaps as few sectors as possible. In the embodiment described above, each initial part of the compressed data (PDCI) together with the reference to the corresponding supplementary part (PDCS) is located aligned to the start of a corresponding sector. Furthermore, the size of the initial parts is selected such that each initial part together with the corresponding index does not allocate more than a single sector. Therefore, it is sufficient to consider an optimised allocation of the supplementary parts (PDCS) such that these overlap as few sectors as possible. Generally, such an (at least partial) optimisation may be achieved by defining an allocation problem for the supplementary parts, where the number of sectors that each supplementary part overlaps (i.e. occupies at least in part) is minimized or at least reduced, e.g. by defining a suitable cost function.

Figure 6:
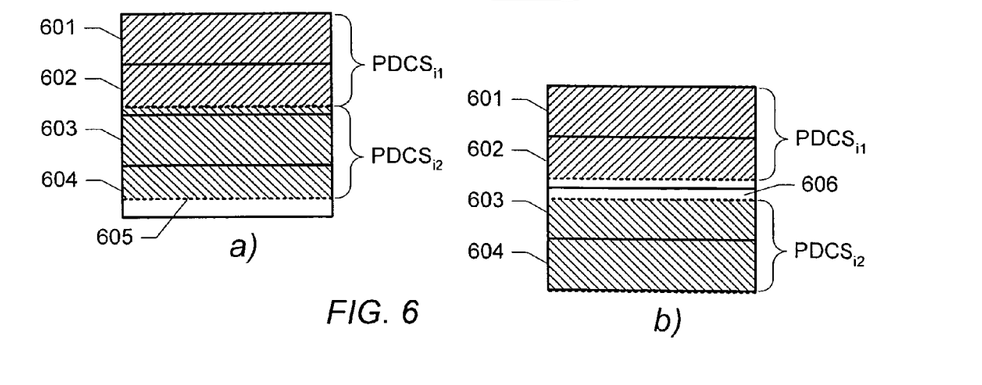
FIGS. 6 and 7 illustrate examples of a layout of supplementary parts of different compressed page data items.

In one embodiment, an at least approximate optimisation may be accomplished by allocating the supplementary parts according to the following rules:

The supplementary parts (PDCS) are combined in pairs, two and two, so that the sum of their sizes as closely as possible fits within any multiple of sectors. Since a perfect match of the size of the pairs with the sector sizes will generally not be possible, at least some of the pairs will leave some unused space in one sector that is only partially occupied by the pair of supplementary parts. In one embodiment, the pairs of supplementary parts are arranged such that one of the supplementary parts of the pair is aligned with the start of a sector, and the other supplementary part is aligned with the end of a sector, such that any gap between the two supplementary parts is less than a sector size. This layout thus further reduces the number of sectors occupied in some situations, as illustrated in FIG. 6. In the example of FIG. 6a, four consecutive sectors 601, 602, 603, and 604, respectively, are shown occupied by a pair of supplementary parts $PDCS_{i1}$ and $PDCS_{i2}$ whose size is closely matched to the size of the four sectors, thus only leaving a small gap of unused memory 605. The supplementary parts of the pair in FIG. 6a are laid out in immediate succession to each other, thus leaving the unused space 605 at the end of the last sector 604. In FIG. 6b an alternative layout of the same pair of supplementary parts within the same four memory sectors is illustrated. In FIG. 6b, supplementary part $PDCS_{i1}$ is aligned with the start of sector 601, while supplementary part $PDCS_{i2}$ is aligned with the end of sector 604, thus leaving the unused space 606 between both supplementary parts around the sector boundary between sectors 602 and 603. This layout reduces the number of sectors that need to be read when retrieving $PDCS_{i2}$. While retrieval of $PDCS_{i2}$ in the layout of FIG. 6a requires reading of sectors 602, 603, and 604, the same operation in FIG. 6b only requires access to sectors 603 and 604.

Figure 7:
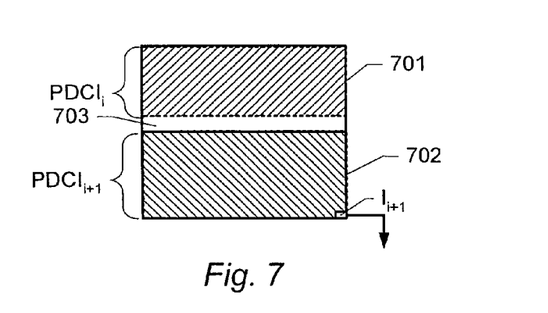

Some of the pages may have been compressed such that the compressed page data entirely fits into one sector, possibly even leaving unused space. The supplementary parts (PDCS) that are small enough to fit within such unused space of sectors allocated for PDCI may thus be placed in such unused space. This situation is illustrated in FIG. 7, illustrating two consecutive memory sectors 701 and 702, respectively. Memory sector 701 is partly occupied by initial part $PDCI_i$, while memory sector 702 is occupied by initial part $PDCI_{i+1}$ and the index $I_{i+1}$ pointing to the corresponding supplementary part (not shown). In the example of FIG. 7, the initial part $PDCI_i$ actually includes the entire compressed page data $PDCI_i$ and even leaves some unused space 703 at the end of sector 701, since the subsequent initial part $PDCI_{i+1}$ is aligned to the start of the subsequent sector 702.

The supplementary parts (PDCS) that are small enough to fit within the unused space of sectors allocated for other pairs PDCS can be placed in such unused space, e.g. the unused space 605 and 606 in FIG. 6.

It is noted that the above embodiments have mainly been described with reference to flash memory. However, it is understood that the method described herein may also be implemented in connection with other types of memory, including memory types that are writable in smaller units, e.g. byte-wise or even bitwise. Furthermore, the method described herein may also be applied in connection with other storage media, such as optical disks, hard disks, floppy disks, tapes, and/or other types of magnetic and/or optical storage media. For example, the method described herein may also be applied to the update of other embedded systems or computers which load programs from a secondary memory/storage medium into RAM before execution.

Similarly, the invention has mainly been described in connection with software to be loaded into the RAM of a processing device. However, it will be appreciated that the methods, devices, systems, and product means described herein may also be applied in connection with other types of data, such as constant data.

The invention can be implemented by means of hardware comprising several distinct elements, and by means of a suitably programmed computer. In the device claims enumerating several means, several of these means can be embodied by one and the same item of hardware, e.g. a suitably programmed microprocessor or computer, and/or one or more communications interfaces as described herein. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of processing data for storage in a storage medium coupled to a processing unit adapted to access data stored in the storage medium as one or more memory pages of data, each memory page having a predetermined page size and a corresponding memory page address, the storage medium being adapted to store data in sectors of a predetermined sector size, the method comprising:
   obtaining one or more compressed data items, each including compressed data corresponding to a respective memory page of uncompressed data;

dividing each of the one or more compressed data items having a compressed data item size larger than a predetermined size into an initial part and a supplementary part;

allocating each initial part together with a respective index data item at respective first memory location associated with the corresponding memory page;

determining respective second memory locations for each of the one or more supplementary parts so as to at least approximately minimize the number of sectors each supplementary part at least partially occupies; and allocating each supplementary part at the determined respective second memory location, wherein each index data item is indicative of the determined second memory location of the supplementary part corresponding to the initial part allocated together with the index data item;

wherein determining respective second memory locations for each of the one or more supplementary parts so as to at least approximately minimize the number of sectors each supplementary part at least partially occupies comprises:

pairing at least a subset of the supplementary parts; and for each pair of supplementary parts:

determining a start address of a first member of said each pair of supplementary parts by aligning the start address of the first member of said each pair of supplementary parts with a start address of a corresponding initial sector of a range of consecutive sectors of the storage medium; and determining a final address of a second member of said each pair of supplementary parts by aligning the final address of the second member of said each pair of supplementary parts with a final address of a corresponding last sector of the range of consecutive sectors of the storage medium.

2. A method according to claim 1, wherein the initial part has an initial part size selected such that a sum of the initial part size and a size of the index data item is no larger than the sector size.

3. A method according to claim 1, wherein the processing unit is adapted to access the data stored in the storage medium based on virtual address information, and wherein the processing unit is adapted to translate the virtual address information into a physical address of the storage medium.

4. A method according to claim 3, wherein allocating each initial part together with a respective index data item at a respective first memory location comprises allocating one or more initial parts and respective index data items as a sequence of initial part data items corresponding to a sequential order of memory pages addressable by the processing unit, where the page size is larger than a predetermined maximum size of the initial part data items.

5. A method according to claim 4, wherein the initial part data items are equally sized.

6. A method according to claim 1, further comprising determining the respective second memory locations within a predetermined space of the storage medium available for storage of the supplementary parts.

7. A method according to claim 1, further comprising arranging at least a subset of the supplementary parts in multiples of supplementary parts so as to at least approximately minimize a predetermined cost criterion.

8. A method according to claim 7, wherein the cost criterion is indicative of a deviation of the respective sizes of the multiples of supplementary parts from respective integer multiples of the sector size.

9. A method according to claim 1, further comprising:

identifying unused memory space in sectors partially occupied by initial part data items;

determining whether at least one of the supplementary parts is small enough to fit in the identified unused space; and if a supplementary part is identified that is small enough to fit into an identified unused space, determining the identified unused space to be the second memory location for allocating the identified supplementary part.

10. A method according to claim 1, further comprising:

identifying unused memory space in sectors partially occupied by a multiple of supplementary parts;

determining whether at least one remaining supplementary part, different from the members of the identified multiple of supplementary parts, is small enough to fit in the identified unused space; and if a remaining supplementary part is identified that is small enough to fit into an identified unused space, determining the identified unused space to be the second memory location for allocating the identified remaining supplementary part.

11. A method according to claim 1, wherein the initial part data item includes the initial part concatenated with the index data item.

12. A method according to claim 1, wherein the compressed data item is a concatenation of the initial part and the supplementary part.

13. A method according to claim 1, further comprising generating a memory image including the allocated initial and supplementary parts at the respective memory locations to which they are allocated.

14. A method according to claim 1, further comprising storing the allocated initial and supplementary parts at the respective memory locations of the storage medium to which they are allocated.

15. A processing device comprising a processing unit and a storage medium coupled to the processing unit, the storage medium being adapted to store data in sectors of a predetermined sector size, the processing unit being adapted to access data stored in the storage medium as one or more pages of data, each page having a predetermined page size and a corresponding virtual memory address, the processing device being adapted to have stored compressed data items in the storage medium, each compressed data item including compressed data corresponding to a corresponding memory page of uncompressed data; wherein the processing device is configured to have stored each compressed data item that is larger than a predetermined size as a corresponding initial part and a supplementary part; wherein the processing device is further configured to store each initial part in the storage medium together with a corresponding index data item at a respective first memory location associated with the corresponding memory page, wherein the processing device is further configured to determine a respective second memory location for each supplementary part so as to at least approximately minimize the number of sectors each supplementary part at least partially occupies and to store each supplementary part in the storage medium at the determined respective second memory location; wherein each index data item is indicative of the second memory location of the supplementary part corresponding to the initial part stored together with the index data item;

wherein the processing device being configured to determine the respective second memory location for each supplementary part so as to at least approximately minimize the number of sectors each supplementary part at least partially occupies comprises the processing device being configured to:

pair at least a subset of the supplementary parts; and for each pair of supplementary parts:

determine a start address of a first member of said each pair of supplementary parts by aligning the start address of the first member of said each pair of supplementary parts with a start address of a corresponding initial sector of a range of consecutive sectors of the storage medium; and determine a final address of a second member of said each pair of supplementary parts by aligning the final address of the second member of said each pair of supplementary parts with a final address of a corresponding last sector of the range of consecutive sectors of the storage medium.

16. A processing device according to claim 15, wherein the initial part has an initial part size selected such that a sum of the initial part size and a size of the index data item is no larger than the sector size.

17. A processing device according to claim 15 wherein the storage medium is a non-volatile storage medium.

18. A processing device according to claim 15, wherein the storage medium is a flash memory.

19. A processing device according to claim 18, wherein the flash memory is a NAND memory.

20. A processing device according to claim 15, further comprising a memory management unit adapted to map pages of a virtual memory space to physical addresses of a primary memory of the processing device.

21. A processing device according to claim 15, further adapted to access the data stored in the storage medium based on virtual address information indicative of memory page content to be loaded from the secondary storage medium into the primary memory; and to map the virtual address information to a physical address of the storage medium.

22. A processing device according to claim 21, wherein the processing device is adapted to map a sequence of memory pages to a corresponding sequence of initial part data items, where the page size is larger than a predetermined maximum size of the initial part data items.

23. A data processing system for generating a memory image including data for storage in a storage medium coupled to a processing unit, the data processing system being configured to perform the steps of a method of processing data for storage in the storage medium coupled to the processing unit adapted to access data stored in the storage medium as one or more memory pages of data, each memory page having a predetermined page size and a corresponding memory page address, the storage medium being adapted to store data in sectors of a predetermined sector size, the method comprising:

obtaining one or more compressed data items, each including compressed data corresponding to a respective memory page of uncompressed data;

dividing each of the one or more compressed data items having a compressed data item size larger than a predetermined size into an initial part and a supplementary part;

allocating each initial part together with a respective index data item at respective first memory location associated with the corresponding memory page;

determining respective second memory locations for each of the one or more supplementary parts so as to at least approximately minimize the number of sectors each supplementary part at least partially occupies; and allocating each supplementary part at the determined respective second memory location, wherein each index data item is indicative of the determined second memory location of the supplementary part corresponding to the initial part allocated together with the index data item;

wherein determining respective second memory locations for each of the one or more supplementary parts so as to at least approximately minimize the number of sectors each supplementary part at least partially occupies comprises:

pairing at least a subset of the supplementary parts; and for each pair of supplementary parts:

determining a start address of a first member of said each pair of supplementary parts by aligning the start address of the first member of said each pair of supplementary parts with a start address of a corresponding initial sector of a range of consecutive sectors of the storage medium; and determining a final address of a second member of said each pair of supplementary parts by aligning the final address of the second member of said each pair of supplementary parts with a final address of a corresponding last sector of the range of consecutive sectors of the storage medium.

24. A non-transitory computer readable storage medium having stored therein program code adapted to cause, when executed by a data processing system including a storage medium coupled to a processing unit, the data processing system to perform the steps of a method of processing data for storage in the storage medium coupled to the processing unit adapted to access data stored in the storage medium as one or more memory pages of data, each memory page having a predetermined page size and a corresponding memory page address, the storage medium being adapted to store data in sectors of a predetermined sector size, the method comprising:

obtaining one or more compressed data items, each including compressed data corresponding to a respective memory page of uncompressed data;

dividing each of the one or more compressed data items having a compressed data item size larger than a predetermined size into an initial part and a supplementary part;

allocating each initial part together with a respective index data item at respective first memory location associated with the corresponding memory page;

determining respective second memory locations for each of the one or more supplementary parts so as to at least approximately minimize the number of sectors each supplementary part at least partially occupies; and allocating each supplementary part at the determined respective second memory location, wherein each index data item is indicative of the determined second memory location of the supplementary part corresponding to the initial part allocated together with the index data item;

wherein determining respective second memory locations for each of the one or more supplementary parts so as to at least approximately minimize the number of sectors each supplementary part at least partially occupies comprises:

pairing at least a subset of the supplementary parts; and for each pair of supplementary parts:

determining a start address of a first member of said each pair of supplementary parts by aligning the start address of the first member of said each pair of supplementary parts with a start address of a corresponding initial sector of a range of consecutive sectors of the storage medium; and determining a final address of a second member of said each pair of supplementary parts by aligning the final address of the second member of said each pair of supplementary parts with a final address of a corresponding last sector of the range of consecutive sectors of the storage medium.

\* \* \* \* \*

UNITED STATES PATENT AND TRADEMARK OFFICE
CERTIFICATE OF CORRECTION

PATENT NO. : 8,799,614 B2
APPLICATION NO. : 12/520086
DATED : August 5, 2014
INVENTOR(S) : Månsson et al.

It is certified that error appears in the above-identified patent and that said Letters Patent is hereby corrected as shown below:

In the Specification

In Column 12, Lines 54-55, delete "compression block 215" and insert -- decompression block 215 --, therefor.

In Column 14, Line 3, delete "$PD_1$," and insert -- $PD_1$ --, therefor.

In Column 14, Line 25, delete "Lpds" and insert -- $L_{pds}$ --, therefor.

In the Claims

In Column 21, Line 22, in Claim 17, delete "claim 15" and insert -- claim 15, --, therefor.

Signed and Sealed this
Second Day of June, 2015

Michelle K. Lee
*Director of the United States Patent and Trademark Office*